Feb. 12, 1929.

E. W. WEAVER 1,701,963

HIGH LIFT TRUCK

Filed March 12, 1927

Inventor
Elverton W. Weaver,
By Brockett & Hyde,
Attorneys

Patented Feb. 12, 1929.

1,701,963

UNITED STATES PATENT OFFICE.

ELVERTON W. WEAVER, OF CLEVELAND, OHIO, ASSIGNOR TO THE ATLAS BOLT & SCREW COMPANY, OF CLEVELAND, OHIO.

HIGH-LIFT TRUCK.

Application filed March 12, 1927. Serial No. 174,844.

This invention relates to electric power trucks of the high lift type; and has for its objects a design and arrangement of parts allowing of such reduced clearances of the lifting mechanism that the possible lift is increased, and resulting in a separation of stresses therein allowing the most efficient provision therefor.

Figure 1:
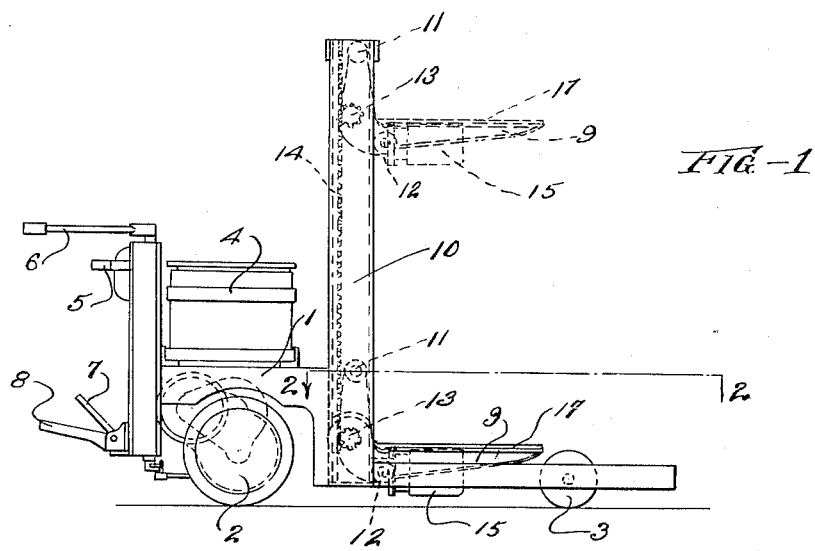
Figure 2:
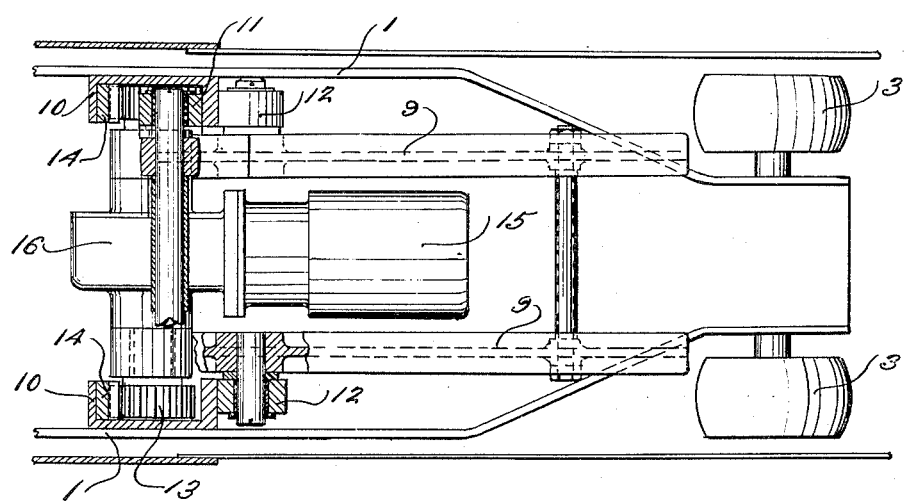

The exact nature of the invention together with advantages thereof will be apparent from the following description taken in connection with the accompanying drawings in which Fig. 1 is a side elevation of a truck embodying my invention, the lifting platform being shown in lowermost position, and in dotted lines in highest position; Fig. 2 is an enlarged sectional plan view taken in the plane of line 2—2, Fig. 1. The truck comprises a frame 1 mounted upon a pair of driving wheels 2 and idler wheels 3. The driving wheels are operated by a motor supplied with current from a battery 4 subject to the controller 5. One pair or all of the wheels may be arranged for steering by the handle 6, a pedal brake 7 being provided accessible from the platform 8 adapted to support the operator of the truck, all in a manner well known in the art.

The load carrying portion of the truck comprises a platform 17 not shown in Fig. 2 but mounted upon the cantilever members 9 arranged for vertical movement along the uprights 10 in a manner to be described. The members 10 are generally of channel section, the near flanges of the channels forming a track for the rollers 11 and 12 carried by each of the members 9 whereby the cantilevers are maintained in horizontally extending position, but capable of vertical movement. The vertical position of the members 9 is controlled by a pair of pinions 13 each adapted for engagement with a rack 14 carried by the opposite flange of the upright channel members 10.

The members 9 carry between them a motor 15 arranged for suitable control from the platform of the operator and connected through suitable reducing gearing in the gear box 16 to drive the pinions 13. The gearing preferably produces a high ratio of speed reduction such that the drive is of the so-called irreversible type, that is, that a capacity weight supported by the cantilevers 9 would be unable through the gearing to rotate the motor 15 to lower itself; so that no brake is required.

I am aware that in trucks of the general type described, the cantilever principle of supporting the platform has been employed heretofore. However, by the arrangement described and particularly by placing the motor 15 between the members 9, its upper extremities approximately on a level therewith, the ultimate in clearance is obtained and a lower extreme position of the platform possible.

Further, strains and stresses of the upright members 10 have been separated, one of the flanges of the channel carrying the bending movement of the cantilevers, the other of the flanges merely serving to back the rack 14.

What I claim is:

1. In a truck of the high lift type, a wheeled frame, a pair of uprights of channel section secured thereon, a corresponding pair of cantilever arms, a load carrying platform supported by said arms, each of said arms being provided with a pair of bearing members in engagement with opposite sides of one flange of one upright to maintain said arm in horizontally extending position but allow vertical bodily movement thereof, the other opposite flange of each upright having a rack, and means for raising and lowering said platform and comprising pinions meshing with said racks and movable with the platform.

2. In a truck of the high lift type, a wheeled frame, a pair of uprights of channel section secured thereon, a corresponding pair of cantilever arms, a load carrying platform supported by said arms, each of said arms being provided with a pair of bearing members in engagement with opposite sides of one flange of one upright to maintain the arm in horizontally extending position but allow vertical bodily movement thereof, the other flange of each upright having a rack, and means for raising and lowering said platform and comprising a motor positioned immediately beneath said platform and between said arms and pinions engaging said racks and arranged to be driven by said motor.

In testimony whereof I hereby affix my signature.

ELVERTON W. WEAVER.